(12) United States Patent
Garcia

(10) Patent No.: US 10,043,364 B2
(45) Date of Patent: Aug. 7, 2018

(54) SYSTEMS AND METHODS FOR DETECTING AND WARNING OF THE PRESENCE OR ABSENCE OF AUTOMOBILE OCCUPANT

(71) Applicant: Wal-Mart Stores, Inc., Bentonville, AR (US)

(72) Inventor: Juana Gabriela Garcia, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 24 days.

(21) Appl. No.: 15/457,567

(22) Filed: Mar. 13, 2017

(65) Prior Publication Data
US 2017/0263098 A1    Sep. 14, 2017

Related U.S. Application Data

(60) Provisional application No. 62/307,669, filed on Mar. 14, 2016.

(51) Int. Cl.
| | |
|---|---|
| *B60Q 1/00* | (2006.01) |
| *G08B 21/02* | (2006.01) |
| *B60N 2/00* | (2006.01) |
| *B60N 2/26* | (2006.01) |

(52) U.S. Cl.
CPC ......... *G08B 21/0202* (2013.01); *B60N 2/002* (2013.01); *B60N 2/26* (2013.01)

(58) Field of Classification Search
CPC ....... G08B 21/0202; B60N 2/002; B60N 2/26
USPC ........................................................ 340/457
See application file for complete search history.

(56) References Cited

U.S. PATENT DOCUMENTS

| | | | |
|---|---|---|---|
| 7,714,737 | B1 | 5/2010 | Morningstar |
| 8,104,293 | B2 | 1/2012 | Barve et al. |
| 8,841,997 | B2 | 9/2014 | Silveira |
| 8,892,302 | B1 | 11/2014 | McDonald |
| 2007/0268119 | A1* | 11/2007 | Cram ....................... B60Q 9/00 340/457 |
| 2008/0100431 | A1 | 5/2008 | Monzo et al. |
| 2009/0079557 | A1 | 3/2009 | Miner |
| 2011/0109450 | A1 | 5/2011 | Hirschfeld et al. |
| 2011/0205060 | A1 | 8/2011 | Taylor |
| 2012/0050021 | A1 | 3/2012 | Rao et al. |
| 2012/0119896 | A1 | 5/2012 | Lam et al. |
| 2014/0052342 | A1 | 2/2014 | Seibert |
| 2014/0266662 | A1 | 9/2014 | Matos |
| 2016/0042616 | A1* | 2/2016 | Dorsey .................. G08B 21/22 340/457 |
| 2016/0210843 | A1* | 7/2016 | Killette .................. G08B 21/24 |

(Continued)

OTHER PUBLICATIONS

Owano, Nancy "Evenflo offers seat solution to remind driver of baby on board," TechExplore.com, Jul. 24, 2015; 3 pages.

(Continued)

*Primary Examiner* — Tanmay Shah
(74) *Attorney, Agent, or Firm* — Schmeiser, Olsen & Watts LLP

(57) ABSTRACT

Provided is a security device, comprising: a sensor that senses a presence in a vehicle and generates a presence signal; an ignition state detection device that detects a state of the vehicle, and generates a status signal; and a rules processor that determines from the presence signal and the status signal whether an alarm or message is to be generated.

19 Claims, 5 Drawing Sheets

(56) References Cited

U.S. PATENT DOCUMENTS

| | | | |
|---|---|---|---|
| 2017/0106768 A1* | 4/2017 | Curtis | B60N 2/002 |
| 2017/0232887 A1* | 8/2017 | Clontz | B60Q 5/005 |
| | | | 340/457 |
| 2017/0236395 A1* | 8/2017 | Cech | G08B 21/0236 |
| | | | 340/449 |

OTHER PUBLICATIONS

Fickenscher, Lisa "Walmart sells baby car seat that prevents hot-car deaths," NYPost.com, Jul. 24, 2015; 2 pages.
Search Report in counterpart UK Patent Application No. 1704034.6, dated May 24, 2017; 6 pages.

\* cited by examiner

SYSTEMS AND METHODS FOR DETECTING AND WARNING OF THE PRESENCE OR ABSENCE OF AUTOMOBILE OCCUPANT

RELATED APPLICATIONS

This application claims the benefit of U.S. Provisional Patent No. 62/307,669, filed Mar. 14, 2016, the contents of which are incorporated herein in its entirety.

FIELD

The present inventive concepts relate generally to alarm systems, and more specifically, to automobile occupant detection systems and methods.

BACKGROUND

Vehicle-related injuries and deaths may occur when an adult operator forgets to remove a child from an automobile on a hot day, or when a vehicle operator is injured while under the influence of drugs or alcohol.

BRIEF SUMMARY

In one aspect, provided is a security device, comprising: a sensor that senses the presence of a person in a vehicle and generates a presence signal; an ignition state detection device that detects a state of the vehicle, and generates a status signal; and a rules processor that determines from the presence signal and the status signal whether an alarm or message is to be generated.

In another aspect, provided is baby car seat, comprising: a sensor that senses the presence of a baby in a car seat; an ignition state detection device that detects whether a car ignition is on or off; an alarm device that receives a signal from the ignition state detection device whether the ignition is on or off; wherein: when the ignition is turned off and the baby or pet is determined to be in the car seat, an alert is generated, and wherein the alert is deactivated when the car ignition is on.

In another aspect, provided is a car seat alarm system, comprising: a sensor that senses the presence of a person in a vehicle and generates a presence signal; an ignition state detection device that detects whether an ignition of the vehicle is on or off, and generates a status signal; and an alarm device that generates an alarm in response to the presence signal and the status signal indicating that the vehicle is off.

BRIEF DESCRIPTION OF THE SEVERAL VIEWS OF THE DRAWINGS

The above and further advantages may be better understood by referring to the following description in conjunction with the accompanying drawings, in which like numerals indicate like structural elements and features in various figures. The drawings are not necessarily to scale, emphasis instead being placed upon illustrating the principles of the concepts.

DETAILED DESCRIPTION

Figure 1:
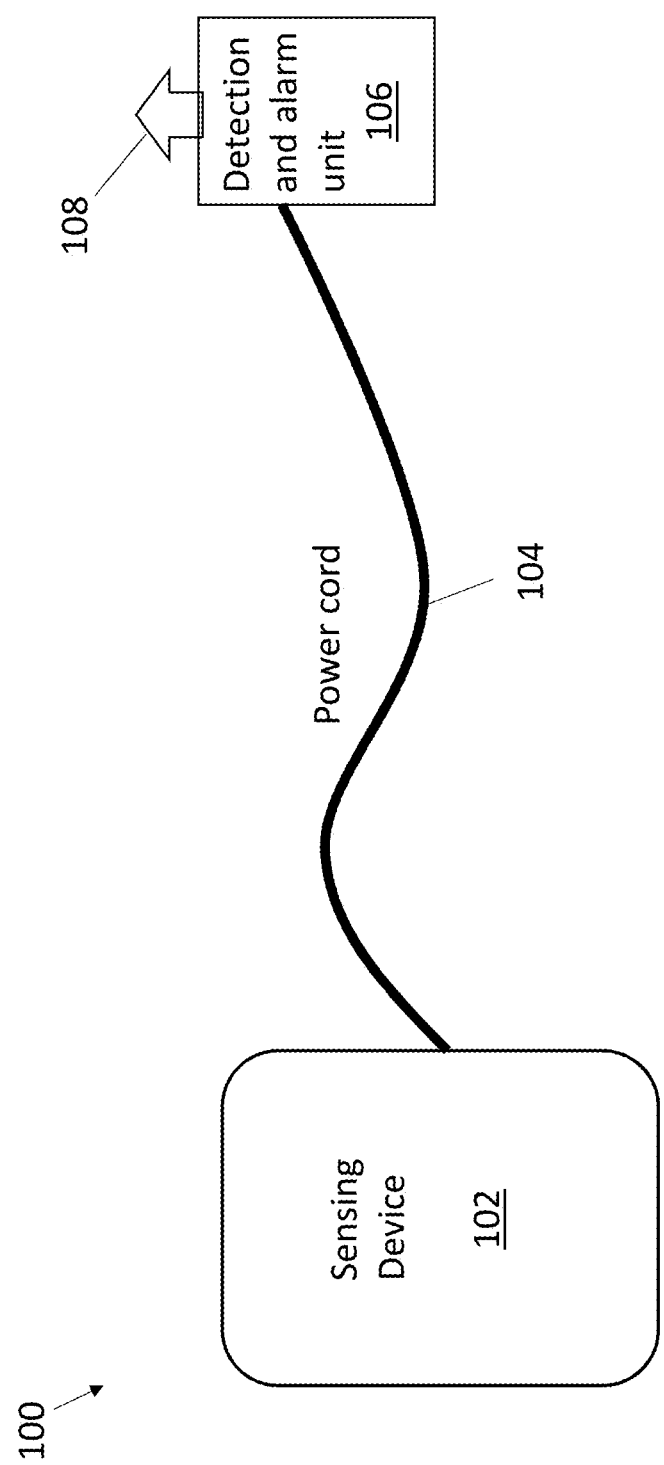
FIG. 1 is a general view of components of an automobile occupant detection and alarm system, in accordance with some embodiments.

FIG. 1 is a general view of components of an automobile occupant detection and alarm system 100, in accordance with some embodiments. The system 100 is constructed and arranged for positioning in an automobile, more specifically, positioned at a driver seat, a passenger seat, and/or a child safety car seat or booster seat.

In some embodiments, as shown in FIG. 1, the system 100 includes a sensing device 102, a power cord 104, a detection and alarm unit 106, and an adapter 108. In some embodiments, the system 100 is constructed for portability, for removing from one automobile and positioning at another automobile. In other embodiments, the sensing device 102 is integrated with a car seat, baby seat, or other child safety apparatus, for example, located under the seat covering, instead of being a standalone device positioned on the sitting apparatus.

The sensing device 102 may be part of a pad, cushion, or related material for positioning on a car seat, for example, a weight pressure sensor pad or other fabric pressure sensor. The sensing device 102, also referred to as a presence sensor can detect weight, by predetermining a minimum weight condition, or it can detect presence via multiple pressure detectors scattered throughout the pad and when 10%, for example, gets activated that would constitute confirmation that a person, animal, or object is present. Therefore, in some embodiments, the sensing device 102 detects a presence such as a weight, or more specifically, a pressure, load, or other force, applied to the sensing device 102. For example, an automobile occupant may sit on a pad that includes the sensing device 102, which is detected by the sensing device 102. The vehicle occupant may be an infant or young child positioned on the sensing device 102, which in turn is positioned on a child safety car seat or booster seat into which the infant or young child is secured. In another example, the sensing device 102 may be positioned on a driver's seat to sense when an occupant is positioned behind the steering wheel. The sensing device 102 may be part of a force-sensitive pad, mat, or other substantially flat configuration that detects when a force such as weight or pressure is applied to a surface of the device 102 and outputs a signal that can be used to trigger an alarm, output a message, or other event in response to the detection of the force. The sensing device 102 may include an enclosure formed of a thin, flexible durable material inside which includes layers of conductive material such as a metal foil separated by a layer of foam or other compressible, non-conductive material with holes in it. Collectively, these elements form a pad, mat, or the like. When a force such as a weight is applied, the foam is compressed so that the metal contacts on either side of the foam contact each other via the holes in the non-conductive material layer to form an electrical circuit. The sensing device 102 may include a printed circuit board (PCB) or the like that that detects a change in resistance when a force is applied.

In some embodiments, the sensing device 102 includes one or more force sensors, load sensors, or the like which measure a force, for example, a weight, applied by whatever is put on them within their range. For example, the sensors may be configured to sense a weight greater than 20 pounds. In some embodiments, the sensing device 102 includes a battery, power connector, or the like for receiving power to perform the foregoing functions. In other embodiments, the sensing device 102 draws power from via the power cord 104 from the detection and alarm unit 106 and/or adapter 108, which as described herein may receive power from a cigarette lighter, electrical outlet, or other source.

Although a sensing device 102 is illustrated and described as sensing a weight, in other embodiments, the sensing device 102 may sense the presence of an occupant at an automobile seat in a different manner, for example, a sensor that uses infrared, thermal detection, laser, or related transducer elements for sensing pressure, temperature, images, color, and/or skin in order to detect the presence of a vehicle occupant. Other elements may equally apply for sensing the presence of an occupant, and are known to those of ordinary skill in the art. Accordingly, different elements than a foam cushion, metal conductors, and so on may equally apply.

When a force detected, a presence signal is generated at the sensing device 102, and can be output to the detection and alarm unit 106. The presence signal generated by the sensing device 102 can include information regarding the detected presence of the occupant, which can be used to determine whether to generate an alarm or message.

The sensing device 102 exchanges electronic signals, for example, presence signals, with the detection and alarm unit 106 by the power cord 104 extending between, and coupled to each of, the sensing device 102 and the detection and alarm unit 106. For example, when a force, e.g., a weight, is applied to the sensing device 102, a circuit is formed in the sensing device 102, resulting in a signal generated that can be output via the power cord 104 to the detection and alarm unit 106. In some embodiments, the sensing device 102 can exchange data with the detection and alarm unit 106 via a wireless communication, for example, using Bluetooth™, RFID, or other wireless technology.

Figure 2:
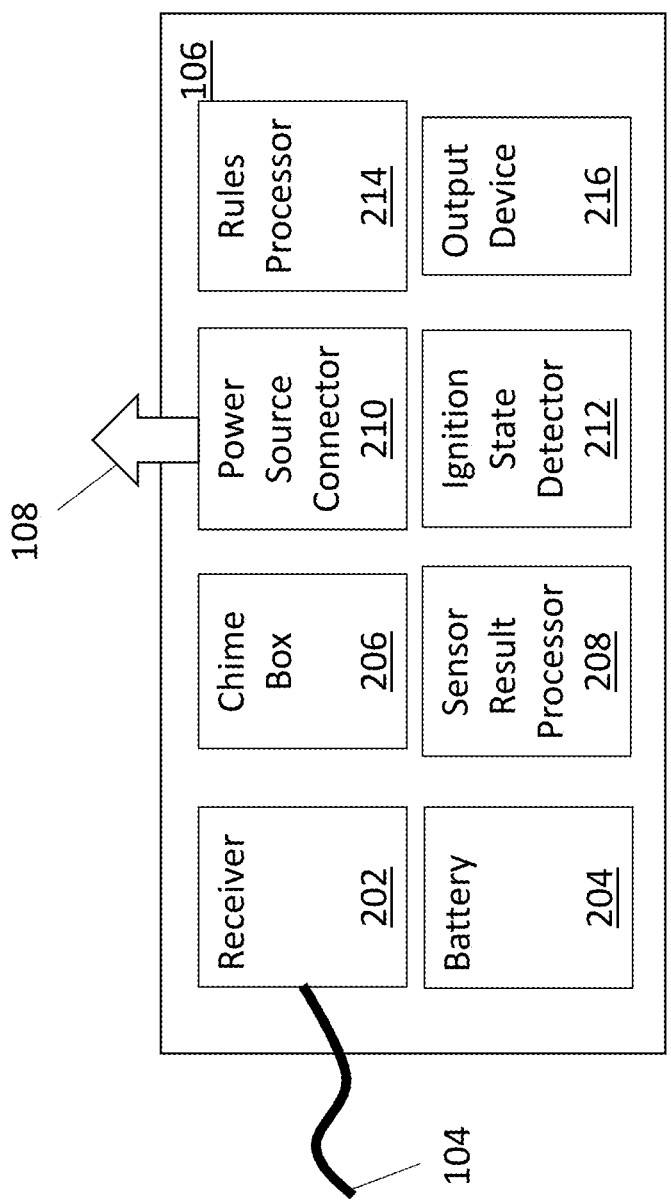
FIG. 2 is a block diagram of a detection and alarm unit, in accordance with some embodiments.

FIG. 2 is a block diagram of a detection and alarm unit 106, in accordance with some embodiments.

As shown in FIG. 2, the detection and alarm unit 106 may comprise, but not be limited to, a receiver 202, battery 204, chime box 206, a sensor result processor 208, a power source connector 210, an ignition state detector 212, a rules processor 214, and an output device 216. The detection and alarm unit 106 includes a housing or enclosure in which are positioned the some or all of the receiver 202, battery 204, chime/sound box 206, sensor result processor 208, power source connector 210, ignition state detector 212, a rules processor 214, and output device 216. In some embodiments, one or more of these elements are part of the sensing device 102. In some embodiments, the ignition state detector 212 is part of the chime/sound box 206. In some embodiments, the chime/sound box 206 is in a separate housing than the detection and alarm unit 106.

The battery 204 can provide power to one or more of the receiver 202, sensor result processor 208, ignition state detector 212, a rules processor 214, and output device 216. The battery 204 may be a reusable battery, and receive power from the power source connector 210. In other embodiments, in the absence of a battery 204, or in combination with the battery 204, the power source connector 210 provides power directly to the receiver 202, sensor result processor 208, ignition state detector 212, a rules processor 214, and output device 216. The adaptor 108 may be part of or coupled to the power source connector 110 and configured for insertion into a cigarette lighter outlet, USB port, or other electrical outlet. In other embodiments, the detection and alarm unit 106 receives power from the receiver 202, instead of, or in addition to the battery 204 and/or power source connector 210. In other embodiments, power may be provided by a backup battery installed in the chime/sound box 206. Here, sufficient power may be provided to at least process received electronic signals, i.e., data, and to generate an alarm from the chime/sound box 206.

The receiver 202 is configured to receive electronic signals from the sensing device 102. In doing so, the receiver 202 is coupled to one end of the power cord 104. The power cord 104 includes conductive wires or other conduits from transmitting signals to the receiver 202 when a force is applied to the sensing device 102. The receiver 202 may include an AC/DC converter, rectifier, regulator, digital controller, and/or other elements for processing the received electronic signals from the sensing device.

The chime/sound box 206 generates an audio alert when a determination is made that the vehicle ignition is off, or other sensing event such as a car door opening when the ignition is on, and the motor is running, and that the sensing device 102 generates a signal output to the detection and alarm unit 106 in response to detecting a weight, e.g., from a person sitting on the sensing device 102. In some embodiments, the sensing device 102 detects the presence of an animal such as a pet, or an object. As described herein, the chime/sound box 206 can generate an alarm when it determines that no power is received from the power cord 104, indicating that the vehicle is off. In other embodiments, the chime/sound box 206 can generate an alarm when it determines that power is received from the power cord 104, indicating that the vehicle is on. Power may be provided by the power cord 104 coupled to a cigarette lighter or USB phone charger in the vehicle.

The sensor result processor 208 includes a computer processor that processes the received presence signal from the sensing device 102 and establishes that the information in the presence signal corresponds to the detection of a weight of a person on the sensing device 102. As mentioned above, the sensing device 102 can detect other events in addition or instead of the weight of a person. For example, the sensing device 102 may detect the heat generated from a person's body, or detect skin color, or camera images of a person sitting on the sensing device 102, or sense noise, smell, tactile, and/or other characteristics of a person.

The chime/sound box 206 may include a recording device that can record and store voice messages, sounds, audio clips, and so on. For example, a person may record a personal chime or message that is personal.

The ignition state detector 212 detects a binary state of the vehicle ignition, for example, whether it is on or off. If the ignition state detector 212 detects that the ignition is off, the ignition state detector 212 generates a status signal that is output to the rules processor 214, which compares the data in the status signal with rules or conditions stored at the rules processor 214 or a storage device in communication with the rules processor 214 to establish whether the chime box 206 should produce an alarm, or audio signal, according to a predetermined recording or established audio sound, and/or whether the output device 216 should output a message to a predetermined receiver. Although an ignition state detector 212 is referred to herein, in other embodiments, other event detectors may equally apply. For example, a car door state detector may be provided that determines whether a car door is open or closed. In another embodiment, a breathalyzer test unit may be integrated with the ignition to prevent drivers from starting a vehicle when alcohol is detected on an occupant's breath, which can also trigger an alarm or message by the system in accordance with some embodiments. A status signal can be generated and sent to the rules processor 214, which may establish that an alarm is to be generated when the car is turned on (motor running), the door is opened while the car is running, and a baby or any another object is still strapped into a car seat.

The ignition state detector 212 can detect a status of the vehicle ignition, for example, whether the ignition is on/off, by operating according to the following. The detector 212 in some embodiments may be part of the chime/sound box 206 or otherwise in communication with the chime/sound box 206. The chime box 206 may detect power either via the receiver 202 or by power received directly by the chime/sound box 206, for example, power received from a cigarette lighter or the USB phone charger unit in a vehicle. When your vehicle is turned off, normally the lighter and phone chargers stop producing power. That lack of power coming into the chime/sound box may break the loop in a circuit formed with the chime/sound box 206, and activate a sound, for example, ab alarm in the chime/sound box 206.

The rules processor 214 includes a computer processor and memory for storing and executing rules under which an audible alarm, electronic message, or related signal is generated and output from the output device 216. Other rules-oriented functions may be performed according to the rules processor 214. For example, the rules processor 214 may output an instruction to the output device 216 to output a pre-recorded voicemail message, email message, or text message when the rules processor 214 receives both a status signal from the ignition state detector 212 that the vehicle ignition is on and a signal from the sensor result processor 208 that a weight, pressure, or other force is detected from a pad of the sensing device 102. In some embodiments, the rules processor 214 can receive user-defined rules or conditions, for example, from a user interface on the user's computer display permitting the user to enter rules under which alarms or messages may be generated. For example, a vehicle owner may submit a rule that establishes that the vehicle owner receive a text message when a weight greater than 20 pounds is detected and the ignition is turned on. In another example, a condition may be established by the parent of a junior operator that prevents the junior operator from driving the vehicle between the hours of 1 a.m. and 5 a.m. The vehicle owner can submit relevant information such as a phone number to receive the message, and so on. if an attempt is made to violate the rule of condition, for example, generating an email message when the junior operator attempts to start the vehicle at 2 a.m., or starts the vehicle but the system detects that the vehicle is moving at 2 p.m. In another example, the vehicle owner may submit a rule that establishes that the vehicle's horn is activated, or a siren sound is emitted from the vehicle's stereo speakers when a weight greater than 8 pounds is detected and the ignition changes state from on to off. The rules processor 214 may be configured to include a programming interface (API) so that third party programmers or users can adjust and personalize settings.

The rules processor 214 may include a software application that, when executed, works in conjunction with the security device components that helps the user manage and personalize option for all these conditions.

In some embodiments, the rules processor 214 processes a rule that incorporates an electronic signal sent to an application executed by a computer processor for connecting and generating an alarm to multiple devices to notify those devices of a status of the presence. The devices may be IOS devices or the like. Notifications may include, for example, ignition off/on, baby in car, time of the condition, temperature of the car, and so on. The rules processor can communicate with the application to collaborate with emergency personnel via a service such as an ONStar service or the like.

The output device 216 is constructed and arranged to output electronic messages such as text messages, email messages, and so on when a determination is made that the vehicle ignition is off and that the sensing device 102 generates a signal output to the detection and alarm unit 106 in response to detecting a weight, e.g., from a person sitting on the sensing device 102. The output device 216 can output a message instead of, or in addition to, the chime/sound box 206 generating an audible alarm. For example, the detection and alarm unit 106 can store a pre-recorded email message that a baby remains in a car seat after the ignition is turned off and the driver has left the vehicle. Here, a sensing device can determine that the door has opened and that the driver has left the vehicle, for example, by a sensor at the driver's seat in communication with the system 100.

The output device 216 can also be constructed and arranged to output electronic messages such as text messages, email messages, and so on when a determination is made that the vehicle ignition is on and that the sensing device 102 generates a signal output to the detection and alarm unit 106 in response to detecting a weight, e.g., from a person sitting on the sensing device 102. This application may pertain to at risk drivers, for example, people prohibited from driving during evening hours, at risk of being under the influence of drugs or alcohol, teen drivers, elderly drivers, and so on.

Figure 4:
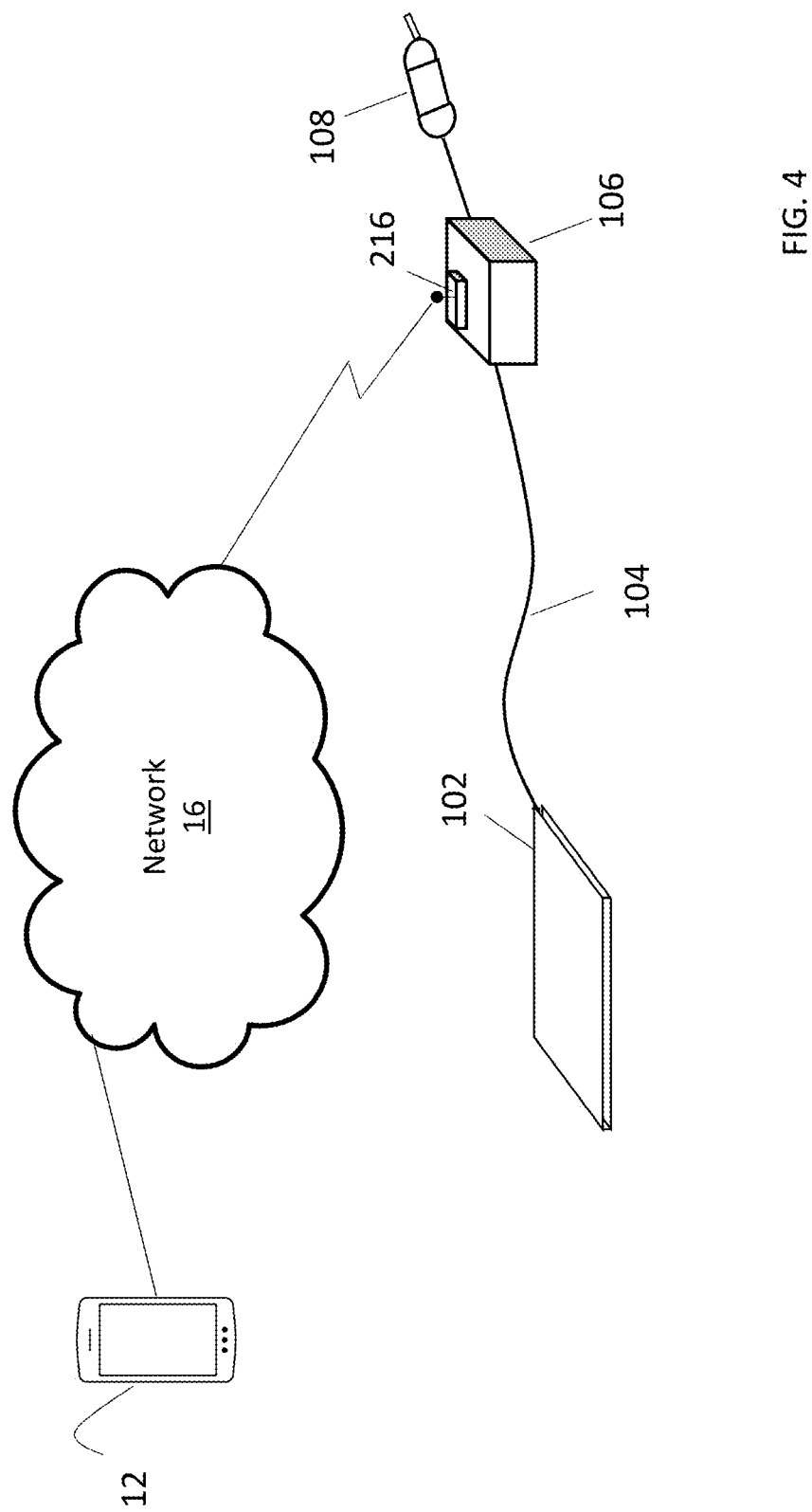
FIG. 4 is a schematic representation of an environment, in which embodiments of the present inventive concepts can be practiced.

In some embodiments, the output device 216 includes a wireless interface, for example, a Bluetooth™ synchronization device, for pairing with an audio device, for example, the vehicle's speakers, or a standalone audio device. In other embodiments, illustrated at FIG. 4, the output device 216 includes a network interface for communicating with a computer device 12 such as a laptop computer, smartphone, and so on via a network 16. The computer device 12 may be programmed to include an application that communicates with the detection and alarm unit 106, for example, to exchange data, provide user-defined rules to the rules processor 214, establish conditions under which alarms are generated, messages are output, and so on. Other data exchanges between the application and device may include setup, activation/inactivation, ecord history of utilization, and so on.

The network 16 may be a public switched telephone network (PSTN), a mobile communications network, a data network, such as a local area network (LAN) or wide area network (WAN), or a combination thereof, or other communication network known to those of ordinary skill in the art. In other embodiments, data signals and so on generated at the detection and alarm unit 106 is output to an application, for example, executed by mobile device 12. The network may be present for exchanging data, or data may be provided directly from the detection and alarm unit 106 to the application.

Figure 3:
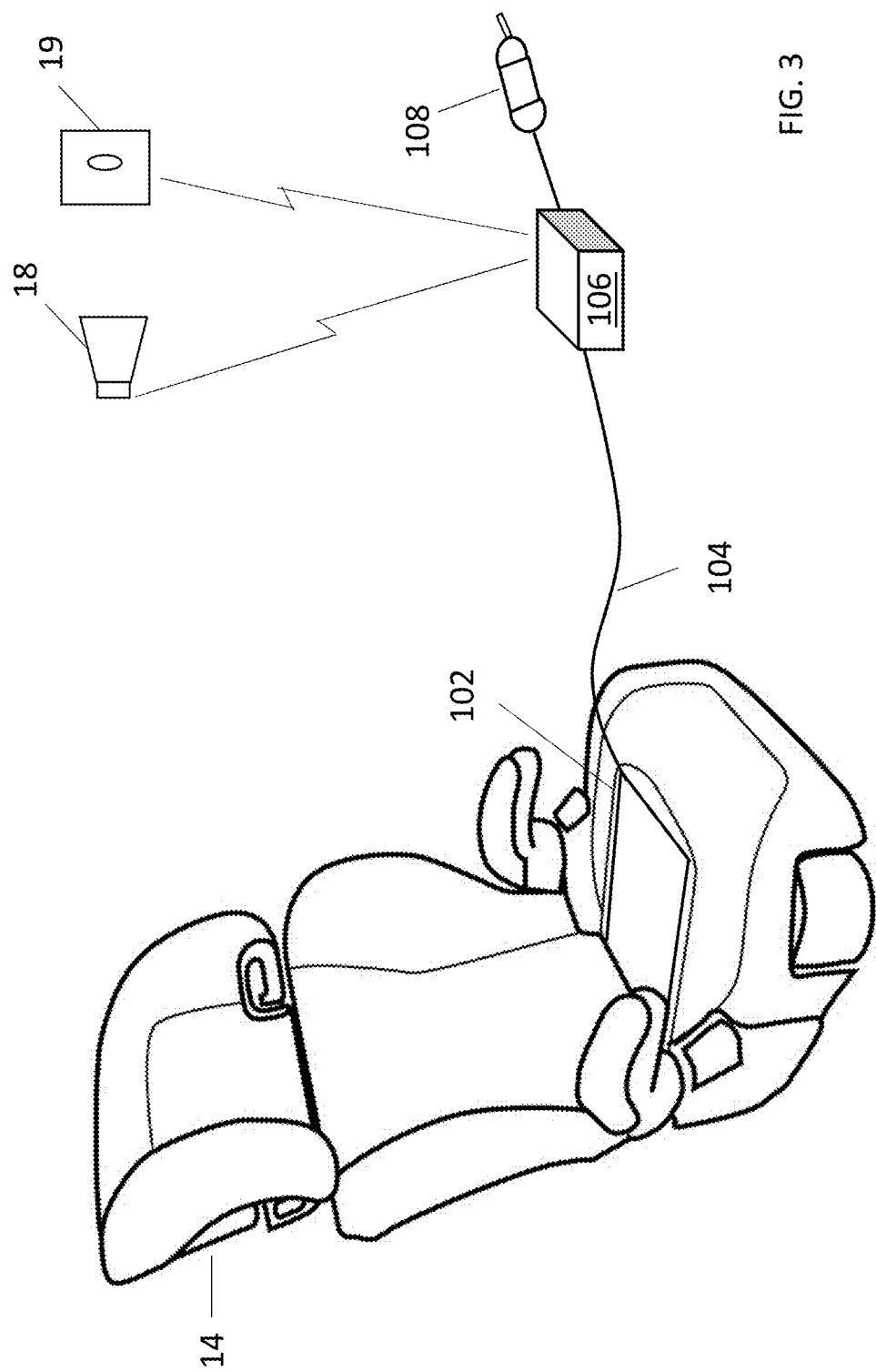
FIG. 3 is a diagram of an application of an automobile occupant detection and alarm system, in accordance with some embodiments.

FIG. 3 is a diagram of an application of an automobile occupant detection and alarm system, in accordance with some embodiments. As shown, a sensing device 102 can be part of a pad, cushion, or the like positioned on a car seat 14. In some embodiments, the pad may include a plurality of sensors distributed throughout the pad, wherein an object may be detected by either meeting a minimum weight requirement or by receiving pressure or touch to a predetermined number of sensors distributed throughout the pad. The sensing device 102 can communicate with a detection and alarm unit 106 by a conduit, or by wireless or other communication. The detection and alarm unit 106 can, in turn, be electrically connected to an adapter 108 which draws power from a cigarette lighter, standard electrical outlet, USB power, or other source.

Figure 5:
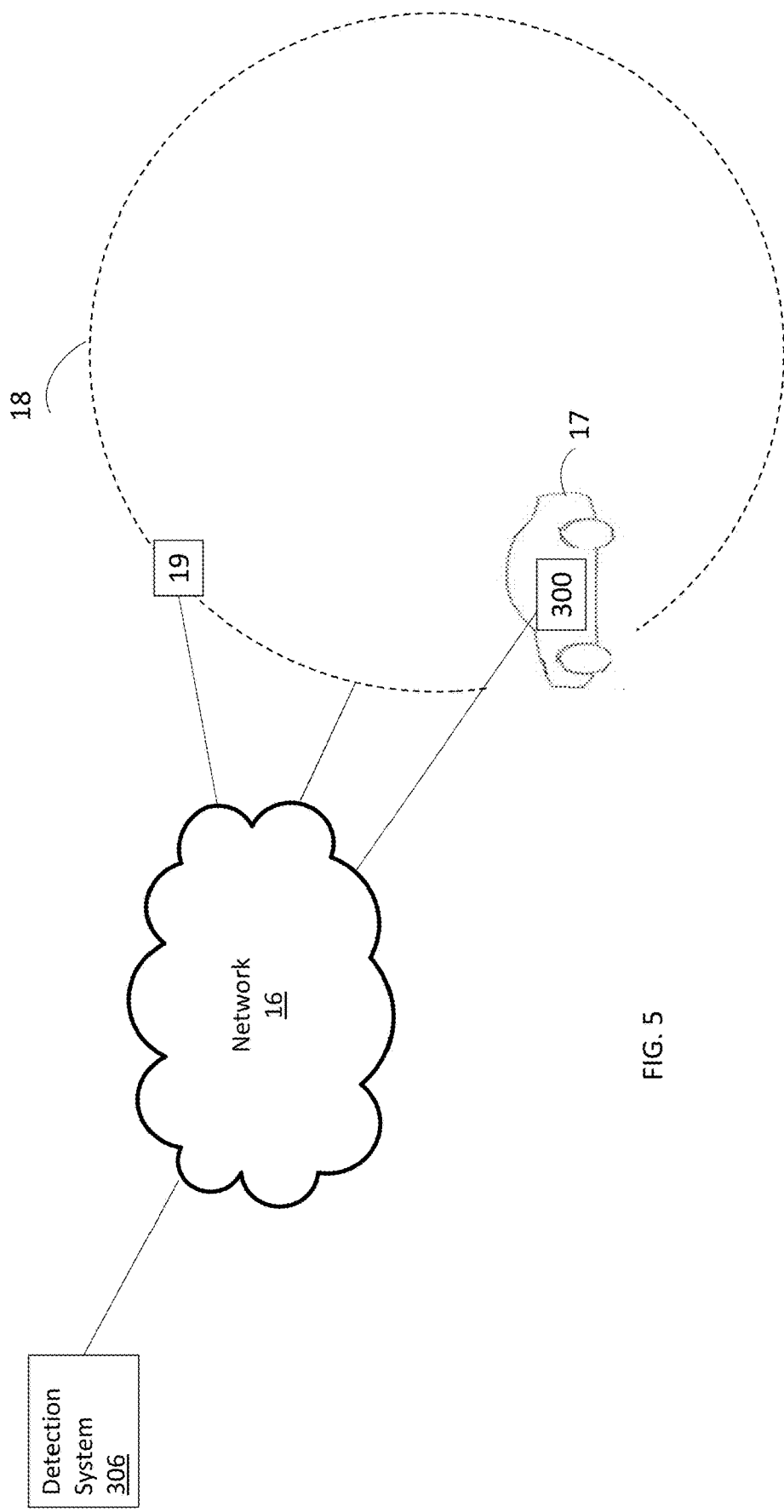
FIG. 5 is a schematic representation of an environment, in which embodiments of the present inventive concepts can be practiced.

FIG. 5 is a schematic representation of an environment, in which embodiments of the present inventive concepts can be practiced. Here, a vehicle 17 can be determined to be in a detection field 18, for example, geofence, Wifi region, or other virtual boundary that establishes whether the vehicle 17 is inside the boundary of the detection field 18 or outside the boundary. The virtual boundary, e.g. geo-fence, may be formed by well-known network devices. The detection system 306 may be similar to or the same as the system 100 described above, and may include a sensing device 300 at the vehicle 17 which sends detection-related information to the detection system 306.

A detection system 306 may communicate with an automobile occupant detection and alarm system 300, in accordance with some embodiments. The automobile occupant detection and alarm system 300 may be similar to systems described in other embodiments herein, except that the detection system 306 is separate from the automobile occupant detection and alarm system 300, and processes data regarding ignition state, vehicle location relate to the virtual boundary 18, and/or sensor data regarding the presence of an occupant in the vehicle, where this data is provided to the detection system 306 from various sources via the network 16. In some embodiments, the detection system 306 receives data from various sources, including sources other than the vehicle in which the automobile occupant detection and alarm system 300 is located.

For example, the automobile occupant detection and alarm system 300 may include weight sensor pad positioned on an occupant seat or baby car seat, and may also receive ignition sensor data from the vehicle 17, location data from a geofence detection sensor 19 or location finder device that establishes whether the vehicle 17 is inside or outside the virtual boundary 18, data from a sensor inside the vehicle 17 indicating that the smell of smoke, alcohol, perfume or cologne, or user-identifiable odor, and so on has been detected, which is output to the detection system 306. The detection system 306 can determine whether criteria is established according to a rules processor in the detection system 306. For example, a rule may establish that an alarm is to be generated if alcohol is detected inside the vehicle and that the vehicle has entered the virtual boundary 18. If the rules criteria is established, then an alarm, message, and so on can be generated, for example, by the detection system 306 sending a signal via the network 16 to an audio source or a message to a predetermined recipient electronic device. For example, the detection system 306 may output a command to activate an alarm when the vehicle has entered or left the geofence boundary 18

In a related example, the power cord 104 is coupled to the chime/sound box 206 in addition to or instead of to the receiver 202. When a vehicle ignition is activated, i.e., turned on, and the sensor 102 senses that a person is sitting in a vehicle seat, car seat, and so on, an alarm may be generated after a predetermined amount of time. The system may include a delay circuit, and/or the rules processor may establish that an alarm is to be generated a predetermined amount of time after either event occurs, for example, 30 seconds. When power received from the power cord 104 is prevented from receiving the chime box 206, or is turned off because the ignition is off, and the sensor senses a weight, then the chime box 206 can generate a sound, for example, a tune, prerecorded message, audio clip, or other sound source.

As described above, in some embodiments, a physical conductive connection may be formed between the vehicle ignition and the state detector 212, where an electrical signal, for example, voltage, current, and so on, is provided from a power source, e.g., cigarette lighter or USB port to the chime/sound box 206. In other embodiments, the system may include a wireless transmitter/receiver for communicating between a computer that sends instructions, criteria and so on to the system 300. Here, the device can communicate via text/email to non-drivers. For example, the referenced chime box can communicate with a smartphone or other personal computer, for example, including an application executed by the computer for communication with the system to receive via a wireless network a text message, email message, pre-recorded voice message, and so on.

As will be appreciated by one skilled in the art, aspects of the inventive concepts may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

The foregoing and other features and advantages of the invention will be apparent to those of ordinary skill in the art from the following more particular description of the invention and the accompanying drawings.

A number of implementations have been described. Nevertheless, it will be understood that the foregoing description is intended to illustrate and not to limit the scope of the inventive concepts which are defined by the scope of the claims. Other examples are within the scope of the following claims.

What is claimed is:

1. A security device, comprising:
a sensor that senses a presence in a vehicle and generates a presence signal;
an ignition state detection device that detects a state of the vehicle, and generates a status signal;
a rules processor that determines from the presence signal and the status signal whether an alarm or message is to be generated; and
an alarm device having a housing and a sound generating device and a backup battery in the housing, wherein in response to the ignition state detection device detecting that an ignition of the vehicle is off, a circuit formed between a power source and the alarm device is broken and the rules processor compares the status signal and the presence signal to a stored user-defined condition provided by a user computer, and a comparison result activates the alarm device to generate an audio output using the backup battery.

2. The security device of claim 1, wherein the state of the vehicle includes a binary state of an ignition of the vehicle.

3. The security device of claim 2, wherein the status signal includes the absence of power to the security device, and wherein the alarm is stopped in response to a determination by the ignition state detection device of the absence of power.

4. The security device of claim 3, wherein the alarm is deactivated when the power is detected to be off.

5. The security device of claim 3, wherein when a determination is made that the ignition is turned on and the presence signal does not sense a weight, the alarm is deactivated.

6. The security device of claim 1, wherein the sensed presence includes the presence of an occupant of the vehicle and the sensor is constructed and arranged as a flat pad that is positioned in a driver seat of the vehicle, and wherein the rules processor generates the alarm or message when the sensor senses the presence of the occupant in the driver seat and the ignition state detection device detects that the ignition is on.

7. The security device of claim 1, wherein the sensed presence includes the presence of a person, child, animal or object and the sensor is constructed and arranged as a flat pad that is positioned in a child safety seat and wherein the rules processor generates the alarm or message when the sensor senses the presence of the child in the child safety seat and the ignition state detection device detects that power is received at the ignition state detection device.

8. The security device of claim 1, wherein when a vehicle ignition is determined to be off and the presence is determined to be in the vehicle, the rules processor sends a message to the alarm device to generate the alarm.

9. The security device of claim 1 further comprising an output device that receives a signal from the ignition state detection device whether the ignition is on or off.

10. The security device of claim 9 wherein when the ignition is determined to be turned off and the person is determined to be in the vehicle, the rules processor sends a message to the output device to output a message to a predetermined recipient.

11. The security device of claim 1, wherein the rules processor executes a software application that operates in conjunction with a combination of the sensor and ignition state detector to manage and personalize options for conditions related to the presence signal and the status signal.

12. A baby car seat, comprising:
a sensor that senses the presence or weight of a baby in a car seat;
an ignition state detection device that detects whether a car ignition is on or off;
an alarm device that receives a signal from the ignition state detection device whether the ignition is on or off, the alarm device having a housing and a sound generating device and a backup battery in the housing, wherein in response to the ignition state detection device detecting that the ignition of the vehicle is off, wherein a circuit formed between a power source and the alarm device is broken, wherein the alarm device is activated to generate an audio output using the backup battery; and wherein: when the ignition is turned off and the baby or pet is determined to be in the car seat, an alert is generated, and wherein the alert is deactivated when the car ignition is on.

13. The baby car seat of claim 12, wherein the ignition state detection device detects whether the car ignition is on or off by determining whether power is received from a vehicle power source at the ignition state detection device.

14. The baby car seat of claim 12, wherein the alarm device comprises a chime box, wherein when the chime box loses power due to the ignition being off, and a baby weight is detected, the chime box will generate a noise signal indicating the presence of the baby.

15. The baby car seat of claim 14, further comprising a single device serves as both the chime box and the ignition state detection device.

16. A car seat alarm system, comprising:

a sensor that senses the presence of a person in a vehicle and generates a presence signal;

an ignition state detection device that detects whether an ignition of the vehicle is on or off, and generates a status signal; and an alarm device that generates an alarm in response to the presence signal and the status signal indicating that the vehicle is off, alarm device having a housing and a sound generating device and a backup battery in the housing, wherein in response to the ignition state detection device detecting that the ignition of the vehicle is off, wherein a circuit formed between a power source and the alarm device is broken, and wherein the alarm device is activated to generate an audio output using the backup battery.

17. The car seat alarm system of claim 16, further comprising:

a rules processor that determines from the presence signal and the status signal whether an alarm or message is to be generated, and compares the status signal and the presence signal to a stored user-defined condition provided by a user computer, and a comparison result activates the alarm device to generate an audio output using the backup battery.

18. The car seat alarm system of claim 16, wherein the rules processor processes a rule that incorporates an electronic signal sent to an application executed by a computer processor for connecting and generating an alarm to multiple devices to notify those devices of a status of the presence.

19. The security device of claim 1, wherein the sensor comprises a first sensor that senses a presence in a vehicle and generates the presence signal, and wherein the security device further comprises a second sensor at a driver's seat of the vehicle that establishes whether a driver of the vehicle has left the vehicle.

* * * * *